United States Patent
Kushida

(10) Patent No.: US 10,563,047 B2
(45) Date of Patent: Feb. 18, 2020

(54) RUBBER COMPOSITION AND PNEUMATIC TIRE INCLUDING THE SAME

(71) Applicant: The Yokohama Rubber Co., LTD., Minato-ku, Tokyo (JP)

(72) Inventor: Naoki Kushida, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/318,659

(22) PCT Filed: Jun. 2, 2015

(86) PCT No.: PCT/JP2015/065856
§ 371 (c)(1),
(2) Date: Dec. 13, 2016

(87) PCT Pub. No.: WO2015/190346
PCT Pub. Date: Dec. 17, 2015

(65) Prior Publication Data
US 2017/0130036 A1    May 11, 2017

(30) Foreign Application Priority Data

Jun. 13, 2014 (JP) ................. 2014-122859

(51) Int. Cl.
C08K 13/02    (2006.01)

(52) U.S. Cl.
CPC .................... *C08K 13/02* (2013.01)

(58) Field of Classification Search
CPC .......... C08K 13/02; C08K 5/548; B60C 1/00; B60C 1/0016; C08L 91/00
USPC ....................................... 523/156
See application file for complete search history.

(56) References Cited

U.S. PATENT DOCUMENTS

| | | | |
|---|---|---|---|
| 6,201,059 B1* | 3/2001 | Wideman | B60C 1/0016 152/450 |
| 6,433,065 B1 | 8/2002 | Lin et al. | |
| 2006/0161015 A1* | 7/2006 | Klockmann | C08K 5/548 556/427 |
| 2008/0188621 A1* | 8/2008 | Ichino | B60C 1/0016 525/232 |
| 2009/0044892 A1 | 2/2009 | Lippello, III et al. | |
| 2009/0056846 A1* | 3/2009 | Hirayama | B60C 1/0016 152/209.5 |
| 2009/0306267 A1* | 12/2009 | York | C08K 5/0025 524/430 |
| 2010/0324168 A1* | 12/2010 | Takizawa | C08L 9/06 523/150 |
| 2011/0160337 A1 | 6/2011 | Ishino | |
| 2012/0041129 A1* | 2/2012 | Steinhauser | B60C 1/0016 524/504 |
| 2012/0289647 A1* | 11/2012 | Koelle | B60C 1/0016 524/525 |
| 2013/0296471 A1 | 11/2013 | Lesage et al. | |
| 2014/0194552 A1 | 7/2014 | Ishino | |
| 2014/0296376 A1 | 10/2014 | Sato et al. | |
| 2015/0375566 A1* | 12/2015 | Akahori | C08K 3/36 524/493 |

FOREIGN PATENT DOCUMENTS

| | | |
|---|---|---|
| EP | 2 028 021 | 2/2009 |
| EP | 2 772 514 | 9/2014 |
| JP | H10-204216 | 8/1998 |
| JP | 2004-511600 | 4/2004 |
| JP | 2009-046677 | 3/2009 |
| JP | 2013-159745 | 8/2013 |
| JP | 2013-224356 | 10/2013 |
| JP | 2014-503619 | 2/2014 |
| JP | 2014-084373 | 5/2014 |
| WO | WO 2002/31040 | 4/2002 |
| WO | WO 2004/056918 | 7/2004 |
| WO | WO 2012/069567 | 5/2012 |
| WO | WO 2013/058219 | 4/2013 |
| WO | WO 2013/077018 | 5/2013 |
| WO | WO 2014/002750 | * 1/2014 |

OTHER PUBLICATIONS

John M. Long et. al., Petroleum Oils for Rubbers, retrieved Mar. 7, 2018, ASTM Standards & Publications, 2 pages.
Extended European Search Report for application No. 15 80 6799 dated Apr. 3, 2018, 9 pages, Germany.
International Search Report for International Application No. PCT/JP2015/065856 dated Sep. 1, 2015, 4 pages, Japan.

* cited by examiner

*Primary Examiner* — Doris L Lee
(74) *Attorney, Agent, or Firm* — Thorpe North & Western

(57) ABSTRACT

A rubber composition contains at least: a diene rubber, a silica, a silane coupling agent having a mercapto group, a plasticizer, and an oil and/or a resin; from 50 to 200 parts by mass of the silica per 100 parts by mass of the diene rubber and from 2 to 20 mass % of the silane coupling agent having a mercapto group relative to the amount of the silica being blended; and a total amount of the plasticizer and the oil and/or the resin being 60 parts by mass or greater per 100 parts by mass of the diene rubber.

13 Claims, No Drawings

RUBBER COMPOSITION AND PNEUMATIC TIRE INCLUDING THE SAME

TECHNICAL FIELD

The present technology relates to a rubber composition and a pneumatic tire using the rubber composition, and particularly relates to a rubber composition that achieves high wet grip performance, period of time required to exhibit the grip performance, stiffness, durability, and wear resistance at high levels, and exhibits excellent processability, and a pneumatic tire using the composition.

BACKGROUND ART

For wet tires for competition, a compound that achieves high wet grip performance, period of time required to exhibit the grip performance, stiffness, durability, and wear resistance at high levels has been demanded.

To enhance the grip performance, techniques that use styrene-butadiene copolymer rubber (SBR) having a high glass transition temperature (Tg) (e.g. see Japanese Unexamined Patent Application Publication No. H10-204216A) and techniques that blend a large amount of silica as a reinforcing filler have been used.

However, when an SBR having a high Tg is used, there are problems in grip performance particularly at low temperatures and problems in that longer period of time is required to exhibit the grip performance. Furthermore, in the techniques to blend a large amount of silica, problems exist in that the silanol groups present on the surface of the silica particles aggregate by forming hydrogen bonding, thereby making the Mooney viscosity of the rubber composition higher during kneading, and thus processability is deteriorated and wear resistance is also deteriorated.

SUMMARY

The present technology provides a rubber composition that achieves high wet grip performance, period of time required to exhibit the grip performance, stiffness, durability, and wear resistance at high levels, and exhibits excellent processability, and a pneumatic tire including the composition.

As a result of diligent research, the inventor of the present technology found that the problems described above can be solved by, in a rubber composition containing at least a diene rubber, a silica, a silane coupling agent having a mercapto group, a plasticizer, and an oil and/or a resin, blending particular amounts of the silica and the particular silane coupling agent and setting a total amount of the plasticizer and the oil and/or the resin to be in a particular range, and thus completed the present technology.

Specifically, the present technology is as follows.

1. A rubber composition including: a diene rubber, a silica, a silane coupling agent having a mercapto group, a plasticizer, and at least one selected from the group consisting of an oil and a resin; where,
an amount of the silica is from 50 to 200 parts by mass per 100 parts by mass of the diene rubber;
an amount of the silane coupling agent having a mercapto group is from 2 to 20 mass % relative to the amount of the silica; and
a total amount of the plasticizer and the at least one selected from the group consisting of the oil and the resin is 60 parts by mass or greater per 100 parts by mass of the diene rubber.

2. The rubber composition according to 1 above, where the total amount of the plasticizer and the at least one selected from the group consisting of the oil and the resin is greater than the amount of the silica.

3. The rubber composition according to 1 above, where a softening point of the resin is from 60 to 180° C. and a weight average molecular weight of the resin is from 500 to 5,000.

4. The rubber composition according to 3 above, where the resin is a terpene phenol resin.

5. The rubber composition according to 3 above, where an amount of the resin is from 10 to 60 parts by mass per 100 parts by mass of the diene rubber.

6. The rubber composition according to 1 above, where the silane coupling agent having a mercapto group is represented by Formula (1):

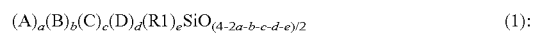

$$(A)_a(B)_b(C)_c(D)_d(R1)_e SiO_{(4-2a-b-c-d-e)/2} \quad (1):$$

where A represents a divalent organic group having a sulfide group, B represents a monovalent hydrocarbon group having from 5 to 10 carbons, C represents a hydrolyzable group, D represents an organic group having a mercapto group, and R1 represents a monovalent hydrocarbon group having from 1 to 4 carbons; and a to e satisfy the relationships $0 \le a < 1$, $0 < b < 1$, $0 < c < 3$, $0 < d < 1$, $0 \le e < 2$, and $0 < 2a+b+c+d+e < 4$.

7. The rubber composition according to 1 above, where the silane coupling agent having a mercapto group is represented by Formula (2):

$$R_{12}-\underset{\underset{R_{13}}{|}}{\overset{\overset{R_{11}}{|}}{Si}}-R_{14}-SH \quad (2)$$

where $R_{11}$, $R_{12}$, and $R_{13}$ are the same or different, and represent an alkyl group having from 1 to 8 carbons, an alkoxy group having from 1 to 8 carbons, a hydrogen atom, an aryl group having from 6 to 30 carbons, or a straight-chain polyether group having a chain length of 4 to 30, and $R_{14}$ represents an alkylene group having from 1 to 30 carbons.

8. The rubber composition according to 1 above, where the diene rubber is a styrene-butadiene copolymer rubber.

9. The rubber composition according to 1 above, where a cetyl trimethyl ammonium bromide specific surface area of the silica is from 100 to 300 m$^2$/g.

10. The rubber composition according to 7 above, where the silane coupling agent having a mercapto group represented by Formula (2) is $[C_{13}H_{27}O(CH_2CH_2O)_5]_2$ $(CH_2CH_2O)Si(CH_2)_3SH$.

11. The rubber composition according to 1 above, where the plasticizer is a carboxylic acid ester plasticizer, a phosphoric acid ester plasticizer, or a sulfonic acid ester plasticizer.

12. The rubber composition according to 11 above, where the plasticizer is a phosphoric acid ester plasticizer.

13. The rubber composition according to 1 above, where the amount of the silica is from 60 to 180 parts by mass per 100 parts by mass of the diene rubber.

14. The rubber composition according to 1 above, where the amount of the silane coupling agent having a mercapto group is from 5 to 15 mass % relative to the amount of the silica.

15. The rubber composition according to 1 above, where the total amount of the plasticizer and the at least one selected from the group consisting of the oil and the resin is from 70 to 200 parts by mass per 100 parts by mass of the diene rubber.

16. A pneumatic tire where the rubber composition described in 1 above is used in a cap tread.

According to the present technology, a rubber composition that achieves high wet grip performance, period of time required to exhibit the grip performance, stiffness, durability, and wear resistance at high levels, and exhibits excellent processability, and a pneumatic tire including the composition can be provided by, in a rubber composition containing at least a diene rubber, silica, a silane coupling agent having a mercapto group, a plasticizer, and an oil and/or a resin, blending particular amounts of the silica and the particular silane coupling agent and setting a total amount of the plasticizer and the oil and/or the resin to be in a particular range.

DETAILED DESCRIPTION

The present technology is described in further detail below.

Diene Rubber

Any diene rubber that can be compounded in rubber compositions may be used as the diene rubber component used in the present technology. Examples thereof include a natural rubber (NR), isoprene rubber (IR), butadiene rubber (BR), styrene-butadiene copolymer rubber (SBR), acrylonitrile-butadiene copolymer rubber (NBR), and the like. These may be used alone, or two or more types may be used in combination. Furthermore, the molecular weight and the microstructure thereof is not particularly limited. The diene rubber component may be terminally modified with an amine, amide, silyl, alkoxysilyl, carboxyl, or hydroxyl group, or the like, or may be epoxidized.

Among these diene rubbers, from the perspective of effectiveness of the present technology, the diene rubber is preferably an SBR.

Silica

Examples of the silica used in the present technology include any silica that is conventionally known for its use in rubber compositions, such as a dry silica, wet silica, colloidal silica, and precipitated silica. A single silica can be used alone or a combination of two or more silicas can be used.

In the present technology, from the perspective of further enhancing the effect of the present technology, the CTAB specific surface area of the silica (measured in accordance with ASTM-D3765-80) is preferably from 100 to 300 m$^2$/g, and more preferably from 120 to 250 m$^2$/g.

Silane Coupling Agent Having Mercapto Group

The silane coupling agent having a mercapto group used in the present technology is preferably a silane coupling agent represented by Formula (1) below and/or Formula (2) below from the perspective of enhancing the effect of the present technology.

First, the silane coupling agent having a mercapto group represented by Formula (1) below will be described below.

$$(A)_a(B)_b(C)_c(D)_d(R1)_e SiO_{(4-2a-b-c-d-e)/2} \quad (1)$$

In Formula (1), A represents a divalent organic group having a sulfide group, B represents a monovalent hydrocarbon group having from 5 to 10 carbons, C represents a hydrolyzable group, D represents an organic group having a mercapto group, and R1 represents a monovalent hydrocarbon group having from 1 to 4 carbons; and a to e satisfy the relationships 0≤a<1, 0<b<1, 0<c<3, 0<d<1, 0≤e<2, and 0<2a+b+c+d+e<4.

The silane coupling agent having a mercapto group represented by Formula (1) (polysiloxane) and the production method thereof are publicly known and, for example, are disclosed in the WO 2014/002750 pamphlet.

In Formula (1) above, A represents a divalent organic group having a sulfide group. Among these, a group represented by Formula (12) below is preferable.

$$*{-}(CH_2)_n{-}S_x{-}(CH_2)_n{-}* \quad (12)$$

In Formula (12) above, n represents an integer of 1 to 10, among which an integer of 2 to 4 is preferable.

In Formula (12) above, x represents an integer of 1 to 6, among which an integer of 2 to 4 is preferable.

In Formula (12) above, * indicates a bond position.

Specific examples of the group represented by Formula (12) above include *—CH$_2$—S$_2$—CH$_2$—*, *—C$_2$H$_4$—S$_2$—C$_2$H$_4$—*, *—C$_3$H$_6$—S$_2$—C$_3$H$_6$—*, *—C$_4$H$_8$—S$_2$—C$_4$H$_8$—*, *—CH$_2$—S$_4$—CH$_2$—*, *—C$_2$H$_4$—S$_4$—C$_2$H$_4$—*, *—C$_3$H$_6$—S$_4$—C$_3$H$_6$—*, *—C$_4$H$_8$—S$_4$—C$_4$H$_8$—*, and the like.

In Formula (1) above, B represents a monovalent hydrocarbon group having from 5 to 20 carbons, and specific examples thereof include a hexyl group, an octyl group, a decyl group, and the like. B is preferably a monovalent hydrocarbon group having from 5 to 10 carbons.

In Formula (1) above, C represents a hydrolyzable group, and specific examples thereof include alkoxy groups, phenoxy groups, carboxyl groups, alkenyloxy groups, and the like. Among these, a group represented by Formula (13) below is preferable.

$$*{-}OR^2 \quad (13)$$

In Formula (13) above, R$^2$ represents an alkyl group having from 1 to 20 carbons, an aryl group having from 6 to 10 carbons, an aralkyl group (aryl alkyl group) having from 6 to 10 carbons, or an alkenyl group having from 2 to 10 carbons, among which an alkyl group having from 1 to 5 carbons is preferable. Specific examples of the alkyl group having from 1 to 20 carbons include a methyl group, an ethyl group, a propyl group, a butyl group, a hexyl group, an octyl group, a decyl group, an octadecyl group, and the like. Specific examples of the aryl group having from 6 to 10 carbons include a phenyl group, a tolyl group, and the like. Specific examples of the aralkyl group having from 6 to 10 carbons include a benzyl group, a phenylethyl group, and the like. Specific examples of the alkenyl group having from 2 to 10 carbons include a vinyl group, a propenyl group, a pentenyl group, and the like.

In Formula (13) above, * indicates a bond position.

In Formula (1) above, D is an organic group having a mercapto group.

Among these, a group represented by Formula (14) below is preferable.

$$*{-}(CH_2)_m{-}SH \quad (14)$$

In Formula (14) above, m represents an integer of 1 to 10, among which an integer of 1 to 5 is preferable.

In Formula (14) above, * indicates a bond position.

Specific examples of the group represented by Formula (14) above include *—CH$_2$SH, *—C$_2$H$_4$SH, *—C$_3$H$_6$SH, *—C$_4$H$_8$SH, *—C$_5$H$_{10}$SH, *—C$_6$H$_{12}$SH, *—C$_7$H$_{14}$SH, *—C$_8$H$_{16}$SH, *—C$_9$H$_{18}$SH, and *—C$_{10}$H$_{20}$SH.

In Formula (1) above, R1 represents a monovalent hydrocarbon group having from 1 to 4 carbons.

In Formula (1) above, a to e satisfy the relationships $0 \leq a < 1$, $0 < b < 1$, $0 < c < 3$, $0 \leq d \leq 1$, $0 \leq e < 2$, and $0 < 2a+b+c+d+e < 4$.

In Formula (1) above, a is preferably $0 < a \leq 0.50$ from the perspective of enhancing the effect of the present technology.

In Formula (1) above, b is preferably $0 < b$, and more preferably $0.10 \leq b \leq 0.89$, from the perspective of enhancing the effect of the present technology.

In Formula (1) above, c is preferably $1.2 \leq c \leq 2.0$ from the perspective of enhancing the effect of the present technology.

In Formula (1) above, d is preferably $0.1 \leq d \leq 0.8$ from the perspective of enhancing the effect of the present technology.

The weight average molecular weight of the polysiloxane is preferably from 500 to 2,300, and more preferably from 600 to 1,500, from the perspective of enhancing the effect of the present technology. The molecular weight of the polysiloxane in the present technology is determined by gel permeation chromatography (GPC) using toluene as a solvent based on calibration with polystyrene.

The mercapto equivalent weight of the polysiloxane determined by the acetic acid/potassium iodide/potassium iodate addition-sodium thiosulfate solution titration method is preferably from 550 to 700 g/mol, and more preferably from 600 to 650 g/mol, from the perspective of having excellent vulcanization reactivity.

The polysiloxane is preferably a polysiloxane having from 2 to 50 siloxane units (—Si—O—) from the perspective of enhancing the effect of the present technology.

Note that other metals other than a silicon atom (e.g. Sn, Ti, and Al) are not present in the backbone of the polysiloxane.

The method of producing the polysiloxane is publicly known and, for example, the polysiloxane can be produced in accordance with the method disclosed in the WO 2014/002750 pamphlet.

Next, the silane coupling agent having a mercapto group represented by Formula (2) below will be described below.

(2)

In Formula (2), $R_{11}$, $R_{12}$, and $R_{13}$ are the same or different, and represent an alkyl group having from 1 to 8 carbons, an alkoxy group having from 1 to 8 carbons, a hydrogen atom, an aryl group having from 6 to 30 carbons, or a straight-chain polyether group having a chain length of 4 to 30, and $R_{14}$ represents an alkylene group having from 1 to 30 carbons.

The silane coupling agent having a mercapto group represented by Formula (2) is publicly known. Representative examples thereof include 3-mercaptopropyl(trimethoxysilane), 3-mercaptopropyl(triethoxysilane), 3-mercaptopropyl(diethoxymethoxysilane), 3-mercaptopropyl(tripropoxysilane), 3-mercaptopropyl(dipropoxymethoxysilane), 3-mercaptopropyl(tributoxysilane), 3-mercaptopropyl(dibutoxymethoxysilane), 3-mercaptopropyl(dimethoxymethylsilane), 3-mercaptopropyl(methoxydimethylsilane), 3-mercaptopropyl(diethoxymethylsilane), 3-mercaptopropyl(ethoxydimethylsilane), 3-mercaptopropyl(dipropoxymethylsilane), 3-mercaptopropyl(propoxydimethylsilane), 3-mercaptopropyl(diisopropoxymethylsilane), 3-mercaptopropyl(isopropoxydimethylsilane), 3-mercaptopropyl(dibutoxymethylsilane), 3-mercaptopropyl(butoxydimethylsilane), 2-mercaptoethyl(trimethoxysilane), 2-mercaptoethyl(triethoxysilane), mercaptomethyl(trimethoxysilane), mercaptomethyl(triethoxysilane), 3-mercaptobutyl(trimethoxysilane), 3-mercaptobutyl(triethoxysilane), $[C_{11}H_{23}O(CH_2CH_2O)_5](CH_2CH_2O)_2Si(CH_2)_3SH$, $[C_{12}H_{25}O(CH_2CH_2O)_3](CH_2CH_2O)_2Si(CH_2)_3SH$, $[C_{12}H_{25}O(CH_2CH_2O)_4](CH_2CH_2O)_2Si(CH_2)_3SH$, $[C_{12}H_{25}O(CH_2CH_2O)_5](CH_2CH_2O)_2Si(CH_2)_3SH$, $[C_{12}H_{25}O(CH_2CH_2O)_6](CH_2CH_2O)_2Si(CH_2)_3SH$, $[C_{13}H_{27}O(CH_2CH_2O)_3](CH_2CH_2O)_2Si(CH_2)_3SH$, $[C_{13}H_{27}O(CH_2CH_2O)_4](CH_2CH_2O)_2Si(CH_2)_3SH$, $[C_{13}H_{27}O(CH_2CH_2O)_5](CH_2CH_2O)_2Si(CH_2)_3SH$, $[C_{13}H_{27}O(CH_2CH_2O)_6](CH_2CH_2O)_2Si(CH_2)_3SH$, $[C_{14}H_{29}O(CH_2CH_2O)_3](CH_2CH_2O)_2Si(CH_2)_3SH$, $[C_{14}H_{29}O(CH_2CH_2O)_4](CH_2CH_2O)_2Si(CH_2)_3SH$, $[C_{14}H_{29}O(CH_2CH_2O)_5](CH_2CH_2O)_2Si(CH_2)_3SH$, $[C_{14}H_{29}O(CH_2CH_2O)_6](CH_2CH_2O)_2Si(CH_2)_3SH$, $[C_{15}H_{31}O(CH_2CH_2O)_5](CH_2CH_2O)_2Si(CH_2)_3SH$, $[C_{11}H_{23}O(CH_2CH_2O)_5]_2(CH_2CH_2O)Si(CH_2)_3SH$, $[C_{12}H_{25}O(CH_2CH_2O)_3]_2(CH_2CH_2O)Si(CH_2)_3SH$, $[C_{12}H_{25}O(CH_2CH_2O)_4]_2(CH_2CH_2O)Si(CH_2)_3SH$, $[C_{12}H_{25}O(CH_2CH_2O)_5]_2(CH_2CH_2O)Si(CH_2)_3SH$, $[C_{12}H_{25}O(CH_2CH_2O)_6]_2(CH_2CH_2O)Si(CH_2)_3SH$, $[C_{13}H_{27}O(CH_2CH_2O)_3]_2(CH_2CH_2O)Si(CH_2)_3SH$, $[C_{13}H_{27}O(CH_2CH_2O)_4]_2(CH_2CH_2O)Si(CH_2)_3SH$, $[C_{13}H_{27}O(CH_2CH_2O)_5]_2(CH_2CH_2O)Si(CH_2)_3SH$, $[C_{13}H_{27}O(CH_2CH_2O)_6]_2(CH_2CH_2O)Si(CH_2)_3SH$, $[C_{14}H_{29}O(CH_2CH_2O)_3]_2(CH_2CH_2O)Si(CH_2)_3SH$, $[C_{14}H_{29}O(CH_2CH_2O)_4]_2(CH_2CH_2O)Si(CH_2)_3SH$, $[C_{14}H_{29}O(CH_2CH_2O)_5]_2(CH_2CH_2O)Si(CH_2)_3SH$, $[C_{14}H_{29}O(CH_2CH_2O)_6]_2(CH_2CH_2O)Si(CH_2)_3SH$, $[C_{15}H_{31}O(CH_2CH_2O)_5]_2(CH_2CH_2O)Si(CH_2)_3SH$, and the like.

Among these, representatively, $[C_{13}H_{27}O(CH_2CH_2O)_5]_2(CH_2CH_2O)Si(CH_2)_3SH$ is preferable and available as Si 363 from Evonik Degussa.

Plasticizer

The plasticizer used in the present technology is preferably a plasticizer that is liquid at the ambient temperature (23° C.), and specific examples thereof include carboxylic acid ester plasticizers, phosphoric acid ester plasticizers, sulfonic acid ester plasticizers, and the like.

Examples of the carboxylic acid ester plasticizer include publicly known phthalic acid esters, isophthalic acid esters, tetrahydrophthalic acid esters, adipic acid esters, maleic acid esters, fumaric acid esters, trimellitic acid esters, linoleic acid esters, oleic acid esters, stearic acid esters, ricinoleic acid esters, and the like.

Examples of the phosphoric acid ester plasticizer include publicly known trimethyl phosphate, triethyl phosphate, tributyl phosphate, tri(2-ethylhexyl) phosphate, 2-ethylhexyl diphenyl phosphate, tributoxyethyl phosphate, triphenyl phosphate, cresyl diphenyl phosphate, isodecyl diphenyl phosphate, tricresyl phosphate, tritolyl phosphate, trixylenyl phosphate, tris(chloroethyl) phosphate, diphenyl mono-o-xenyl phosphate, and the like.

Examples of the sulfonic acid ester plasticizer include publicly known benzene sulfone butylamide, toluenesulfonamide, N-ethyl-toluenesulfonamide, N-cyclohexyl-p-toluenesulfonamide, and the like.

Among these, a phosphoric acid ester plasticizer is preferable in the present technology.

Oil

Examples of the oil used in the present technology include publicly known mineral oils, such as paraffin-based process oils, naphthene-based process oils, and aromatic process oils.

Resin

The resin used in the present technology preferably has a softening point of 60 to 180° C. and a weight average molecular weight of 500 to 5,000 from the perspective of enhancing the effect of the present technology. The "weight average molecular weight" in the present technology refers to weight average molecular weight determined by gel permeation chromatography (GPC) based on calibration with polystyrene. Furthermore, as the type of the resin, a terpene phenol resin is preferable. The terpene phenol resin is obtained by reacting a terpene compound with a phenol and is publicly known.

Rubber Composition Compounding Ratio

The rubber composition of the present technology contains, per 100 parts by mass of the diene rubber, from 50 to 200 parts by mass of the silica, and from 2 to 20 mass % of the silane coupling agent having a mercapto group relative to the amount of the silica, as well as 60 parts by mass or greater of the total amount of the plasticizer and the oil and/or the resin per 100 parts by mass of the diene rubber.

When the amount of the silica is less than 50 parts by mass, wet grip performance is deteriorated, and on the other hand, when the amount is greater than 200 parts by mass, dispersibility is deteriorated, thereby causing deterioration in physical properties.

When the amount of the silane coupling agent is less than 2 mass % relative to the amount of the silica, the effect of the present technology cannot be exhibited because the amount is too small. On the other hand, when the amount is greater than 20 mass %, processability is deteriorated.

When the total amount of the plasticizer and the oil and/or the resin is less than 60 parts by mass per 100 parts by mass of the diene rubber, wet grip performance is deteriorated.

The amount of the silica is more preferably from 60 to 180 parts by mass per 100 parts by mass of the diene rubber.

The amount of the silane coupling agent having a mercapto group is more preferably from 5 to 15 mass % relative to the amount of the silica.

The total amount of the plasticizer and the oil and/or the resin is more preferably from 70 to 200 parts by mass per 100 parts by mass of the diene rubber.

Furthermore, the plasticizer is preferably blended in an amount of 5 to 30 parts by mass per 100 parts by mass of the diene rubber, the oil is preferably blended in an amount of 30 to 80 parts by mass per 100 parts by mass of the diene rubber, and the resin is preferably blended in an amount of 10 to 60 parts by mass per 100 parts by mass of the diene rubber.

Note that the total amount of the plasticizer and the oil and/or the resin is preferably greater than the amount of the silica. According to this embodiment, wet grip performance is exhibited.

In addition to the components described above, the rubber composition of the present technology may also contain various types of additives commonly added to rubber compositions, such as vulcanizing or cross-linking agents, vulcanizing or cross-linking accelerators, various fillers, and anti-aging agents. These additives may be kneaded according to an ordinary method to form a composition, and used to perform vulcanization or cross-linking. Any conventional ordinary amount of these additives may be added to the extent that the object of the present technology is not hindered.

Since the rubber composition of the present technology can achieve high wet grip performance, period of time required to exhibit the grip performance, stiffness, durability, and wear resistance at high levels, the use thereof is preferably for tires, and in particular, the rubber composition is preferably used for cap treads.

Additionally, the rubber composition of the present technology can be used to manufacture a pneumatic tire according to a conventional method for manufacturing pneumatic tires.

EXAMPLES

The present technology will now be described in further detail by way of working examples and comparative examples, but the present technology is not limited by these examples.

Working Examples 1 to 4 and Comparative Examples 1 to 4

Preparation of Samples

According to the composition (part by mass) shown in Table 1, the components other than the vulcanization accelerator and sulfur were kneaded for 5 minutes in a 1.7-liter sealed Banbury Mixer. The vulcanization accelerator and sulfur were then added to the mixture and further kneaded to obtain a rubber composition. Thereafter, the obtained rubber composition was pressure-vulcanized in a predetermined mold at 160° C. for 20 minutes to obtain a vulcanized rubber test sample, and then the physical properties of the unvulcanized rubber composition and the vulcanized rubber test sample were measured by the test methods described below.

tan δ (0° C.): Using a viscoelastic spectrometer, manufactured by Toyo Seiki Seisaku-sho, Ltd., tan δ (0° C.) was measured at 0° C. under the following conditions: initial distortion=10%; amplitude=±2%, and frequency=20 Hz. The obtained value was used to evaluate wet grip performance. The result was expressed as an index with the value of Comparative Example 1 defined as an index of 100. A larger value indicates superior wet grip performance.

E' (0° C.): Using a viscoelastic spectrometer, manufactured by Toyo Seiki Seisaku-sho, Ltd., E' (0° C.) was measured at 0° C. under the following conditions: initial distortion=10%; amplitude=±2%, and frequency=20 Hz. The obtained value was used to evaluate the period of time required to exhibit the grip performance. The result was expressed as an index with the value of Comparative Example 1 defined as an index of 100. A smaller value indicates a shorter period of time required to exhibit the grip performance.

300% Modulus: 300% modulus was evaluated by a tensile test based on JIS (Japanese Industrial Standard) K 6251. The result was expressed as an index with the value of Comparative Example 1 defined as an index of 100. A larger index indicates a higher modulus.

Wear resistance: Using a Lambourn abrasion resistance test machine (manufactured by Iwamoto Quartz GlassLab Co., Ltd.), wear resistance was measured in accordance with JIS K 6264 under the following conditions: load=4.0 kg (39 N) and slip rate=30%. The result was expressed as an index with the value of Comparative Example 1 defined as an index of 100. A larger value indicates superior wear resistance.

Mooney viscosity: Using the rubber composition, viscosity of the unvulcanized rubber at 100° C. was measured in accordance with JIS K 6300. The result was expressed as an index with the value of Comparative Example 1 defined as an index of 100. A smaller index indicates a lower viscosity and thus indicates superior processability.

The results are shown in Table 1.

TABLE 1

|  | Comparative Example 1 | Comparative Example 2 | Comparative Example 3 | Comparative Example 4 |
|---|---|---|---|---|
| SBR *1 | 137.5 | 137.5 | 137.5 | 137.5 |
| Silica *2 | 80 | 80 | 80 | 45 |
| Carbon black *3 | 10 | 10 | 10 | 10 |
| Silane coupling agent-1 *4 | 8 | 8 | — | — |
| Silane coupling agent-2 *5 | — | — | 8 | 8 |
| Silane coupling agent-3 *6 | — | — | — | — |
| Oil *7 | 60 | 50 | 60 | 15 |
| Plasticizer *8 | — | 10 | — | 10 |
| Terpene phenol resin *9 | 30 | 30 | 30 | 30 |
| Oil + plasticizer + resin (part by mass) | 90 | 90 | 90 | 55 |
| Zinc oxide *10 | 2 | 2 | 2 | 2 |
| Stearic acid *11 | 2 | 2 | 2 | 2 |
| Anti-aging agent *12 | 2 | 2 | 2 | 2 |
| Sulfur *13 | 1.5 | 1.5 | 1.5 | 1.5 |
| Vulcanization accelerator-1 *14 | 2 | 2 | 2 | 2 |
| Vulcanization accelerator-2 *15 | 0.5 | 0.5 | 0.5 | 0.5 |
| Measurement results |  |  |  |  |
| tan δ (0° C.) | 100 | 90 | 115 | 60 |
| E' (0° C.) | 100 | 80 | 75 | 60 |
| 300% Modulus | 100 | 98 | 94 | 115 |
| Wear resistance | 100 | 102 | 90 | 118 |
| Mooney viscosity (100° C.) | 100 | 99 | 115 | 90 |

|  | Working Example 1 | Working Example 2 | Working Example 3 | Working Example 4 |
|---|---|---|---|---|
| SBR *1 | 137.5 | 137.5 | 137.5 | 137.5 |
| Silica *2 | 80 | 80 | 80 | 80 |
| Carbon black *3 | 10 | 10 | 10 | 10 |
| Silane coupling agent-1 *4 | — | — | — | — |
| Silane coupling agent-2 *5 | 8 | 8 | — | 8 |
| Silane coupling agent-3 *6 | — | — | 8 | — |
| Oil *7 | 50 | 40 | 50 | 60 |
| Plasticizer *8 | 10 | 20 | 10 | 30 |
| Terpene phenol resin *9 | 30 | 30 | 30 | — |
| Oil + plasticizer + resin (part by mass) | 90 | 90 | 90 | 90 |
| Zinc oxide *10 | 2 | 2 | 2 | 2 |
| Stearic acid *11 | 2 | 2 | 2 | 2 |
| Anti-aging agent *12 | 2 | 2 | 2 | 2 |
| Sulfur *13 | 1.5 | 1.5 | 1.5 | 1.5 |
| Vulcanization accelerator-1 *14 | 2 | 2 | 2 | 2 |
| Vulcanization accelerator-2 *15 | 0.5 | 0.5 | 0.5 | 0.5 |
| Measurement results |  |  |  |  |
| tan δ (0° C.) | 114 | 110 | 120 | 108 |
| E' (0° C.) | 65 | 55 | 55 | 53 |
| 300% Modulus | 102 | 104 | 108 | 109 |
| Wear resistance | 105 | 110 | 110 | 115 |
| Mooney viscosity (100° C.) | 100 | 98 | 90 | 94 |

*1: SBR (E581, manufactured by Asahi Kasei Corporation; styrene content = 37 mass %; vinyl content = 42 mass %; glass transition temperature (Tg) = −27° C.; oil extender content = 37.5 parts by mass per 100 parts by mass of SBR)
*2: Silica (Zeosil 1165MP, manufactured by Rhodia; CTAB specific surface area = 159 $m^2/g$)
*3: Carbon black (SEAST 9, manufactured by Tokai Carbon Co., Ltd.; nitrogen adsorption specific surface area ($N_2SA$) = 142 $m^2/g$)
*4: Silane coupling agent-1 (Si 69, manufactured by Evonik Degussa; bis(3-triethoxysilylpropyl)tetrasulfide)
*5: Silane coupling agent-2 (compound that satisfies Formula (2) above; Si 363, manufactured by Evonik Degussa)
*6: Silane coupling agent-3 (compound that satisfies Formula (1) above synthesized according to Synthesis Example 1 of the WO 2014/002750 pamphlet; compositional formula = $(-C_3H_6-S_4-C_3H_6-)_{0.083}(-C_8H_{17})_{0.667}(-OC_2H_5)_{1.50}(-C_3H_6SH)_{0.167}SiO_{0.75}$; average molecular weight = 860)
*7: Aroma oil (Extract No. 4S, manufactured by Showa Shell Sekiyu K.K.)
*8: Plasticizer (tricresyl phosphate, manufactured by Daihachi Chemical Industry Co., Ltd.)
*9: Terpene phenol resin (YS Polyster T145, manufactured by Yasuhara Chemical Co., Ltd.; softening point = 145 ± 5° C.; weight average molecular weight = 1,500)
*10: Zinc oxide (Zinc Oxide III, manufactured by Seido Chemical Industry Co., Ltd.)
*11: Stearic acid (Beads Stearic Acid YR, manufactured by NOF Corporation)
*12: Anti-aging agent (6PPD, manufactured by Flexsys)
*13: Sulfur ("Golden Flower" Oil Treated Sulfur Powder, manufactured by Tsurumi Chemical)
*14: Vulcanization accelerator-1 (NOCCELER D, manufactured by Ouchi Shinko Chemical Industrial Co., Ltd.)
*15: Vulcanization accelerator-2 (NOCCELER CZ-G, manufactured by Ouchi Shinko Chemical Industrial Co., Ltd.)

As is clear from Table 1 above, since the rubber compositions prepared in Working Examples 1 to 4 contained particular amounts of the silica and the silane coupling agent and a particular range of the total amount of the plasticizer and the oil and/or the resin while the rubber composition contained at least the diene rubber, the silica, the silane coupling agent having a mercapto group, the plasticizer, and the oil and/or the resin, tan δ (0° C.), E' (0° C.), 300% modulus, wear resistance, and Mooney viscosity were enhanced compared to those of Comparative Example 1 which was a representative conventional example, high wet grip performance, period of time required to exhibit the grip performance, stiffness, durability, and wear resistance were achieved at high levels, and excellent processability was also achieved.

Meanwhile, in Comparative Example 2, tan δ (0° C.) and 300% modulus were deteriorated since the silane coupling agent having a mercapto group was not blended.

In Comparative Example 3, 300% modulus and wear resistance were deteriorated since the plasticizer was not blended.

In Comparative Example 4, tan δ (0° C.) was deteriorated since the total amount of the plasticizer, the oil, and the resin was less than the lower limit specified in the present technology.

The invention claimed is:

1. A rubber composition comprising: a diene rubber, a silica, a silane coupling agent having a mercapto group, a second silane coupling agent, a plasticizer, an oil and a resin; wherein,
   a compounded amount of the silica is from 90 to 200 parts by mass per 100 parts by mass of the diene rubber;
   a compounded amount of the silane coupling agent having a mercapto group is from 2 to 20 mass % relative to the amount of the silica;
   an amount of the plasticizer is from 5 to 30 parts by mass per 100 parts by mass of the diene rubber;
   an amount of the oil is from 30 to 80 parts by mass per 100 parts by mass of the diene rubber;
   an amount of the resin is from 10 to 60 parts by mass per 100 parts by mass of the diene rubber; and
   a total amount of the plasticizer, the oil and the resin is 60 parts by mass or greater per 100 parts by mass of the diene rubber; wherein
   wherein a softening point of the resin is from 60 to 180° C. and a weight average molecular weight of the resin is from 500 to 5,000;
   the silane coupling agent having a mercapto group is represented by Formula (1):

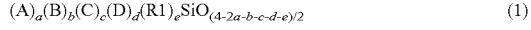

wherein, A represents a divalent organic group having a sulfide group, B represents a monovalent hydrocarbon group having from 5 to 10 carbons, C represents a hydrolyzable group, D represents an organic group having a mercapto group, and R1 represents a monovalent hydrocarbon group having from 1 to 4 carbons; and a to e satisfy the relationships $0 \le a<1$, $0<b<1$, $0<c<3$, $0<d<1$, $0 \le e<2$, and $0<2a+b+c+d+e<4$;

the second silane coupling agent has the mercapto group and is represented by Formula (2):

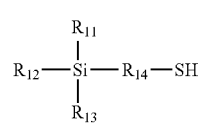

wherein, $R_{11}$, $R_{12}$ $R_{13}$ are the same or different, and represent an alkogroup having from 1 to 8 carbons, an alkoxy group having from 1 to 8 carbons, a hydrogen atom, an aryl group having from 6 to 30 carbons, or a straight-chain polyether group having a chain length of 4 to 30, and $R_{14}$ represents an alkylene group having from 1 to 30 carbons; and
   a compounded amount of the silane coupling agent and the second silane coupling agent is from 2 to 20 mass % relative to the amount of the silica.

2. The rubber composition according to claim 1, wherein the resin is a terpene phenol resin.

3. The rubber composition according to claim 1, wherein the diene rubber is a styrene-butadiene copolymer rubber.

4. The rubber composition according to claim 1, wherein a cetyl trimethyl ammonium bromide specific surface area of the silica is from 100 to 300 m²/g.

5. The rubber composition according to claim 1, wherein the second silane coupling agent having the mercapto group represented by Formula (2) is $[C_{13}H_{27}O(CH_2CH_2O)_5]_2(CH_2CH_2O)Si(CH_2)_3SH$.

6. The rubber composition according to claim 1, wherein the compounded amount of the silane coupling agent having a mercapto group is from 5 to 15 mass % relative to the amount of the silica.

7. The rubber composition according to claim 1, wherein the total amount of the plasticizer, the oil and the resin is from 70 to 200 parts by mass per 100 parts by mass of the diene rubber.

8. The rubber composition according to claim 1, wherein the plasticizer is a carboxylic acid ester plasticizer or a sulfonic acid ester plasticizer.

9. The rubber composition according to claim 1, wherein a CTAB specific surface area of the silica is from 175 to 300 m²/g.

10. The rubber composition according to claim 1, wherein:
    the rubber composition is a cap tread rubber composition for a pneumatic tire; and
    a softening point of the resin is from 60 to 180° C. and a weight average molecular weight of the resin is from 500 to 5,000.

11. The rubber composition according to claim 1, wherein the plasticizer is a carboxylic acid ester plasticizer, a phosphoric acid ester plasticizer, or a sulfonic acid ester plasticizer.

12. The rubber composition according to claim 11, wherein the plasticizer is a phosphoric acid ester plasticizer.

13. A pneumatic tire wherein the rubber composition described in claim 1 is used in a cap tread.

* * * * *